A. W. JOHNSON.
SIGNAL.
APPLICATION FILED AUG. 16, 1919.
1,380,969.
Patented June 7, 1921.
2 SHEETS—SHEET 1.
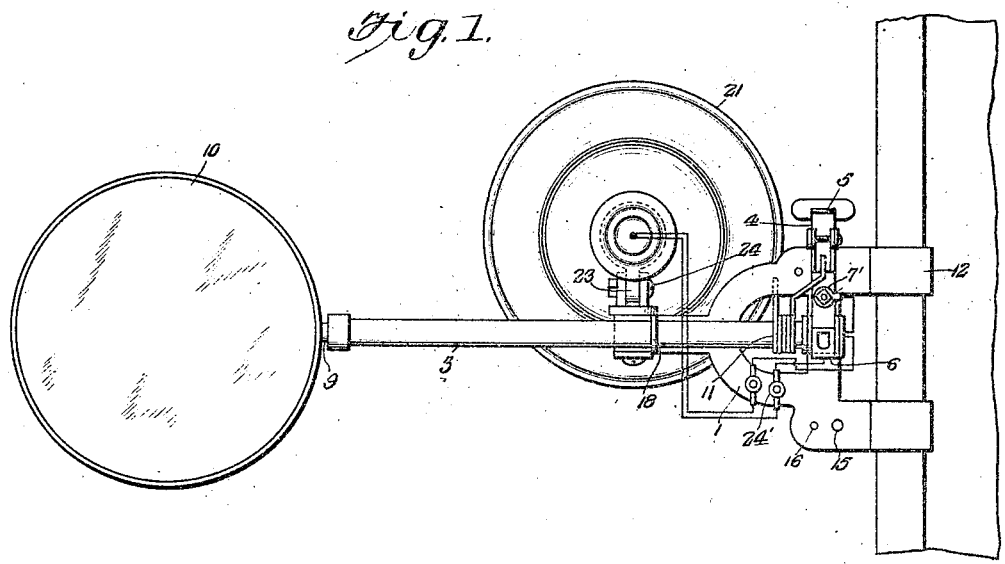
Fig. 1.
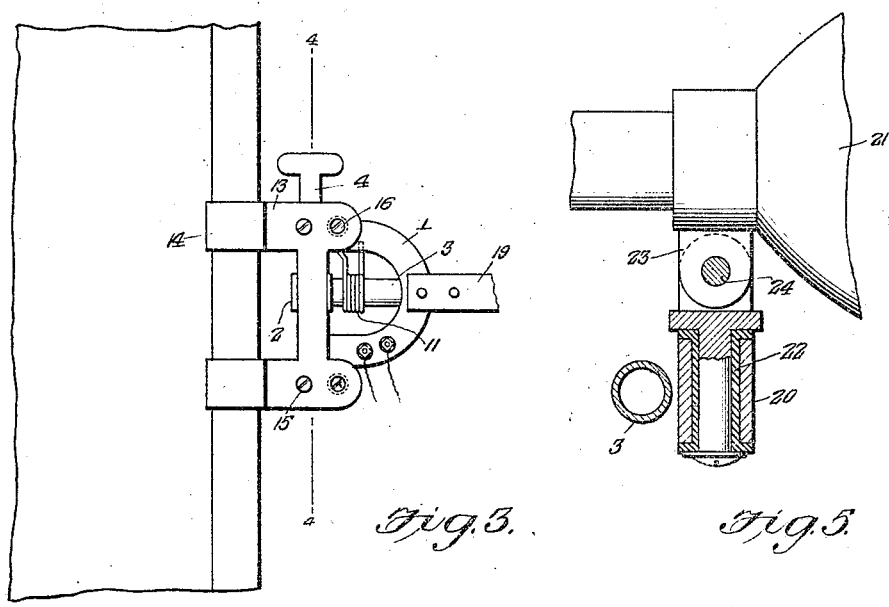
Fig. 3.
Fig. 5.
WITNESSES
J H Crawford
INVENTOR.
BY A. W. Johnson,
Victor J. Evans
ATTORNEY.

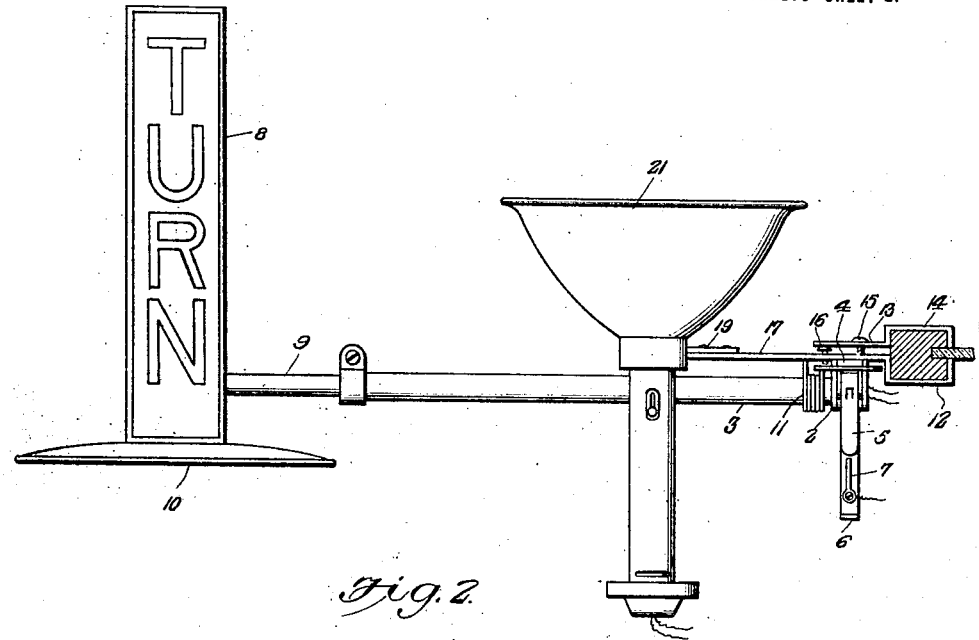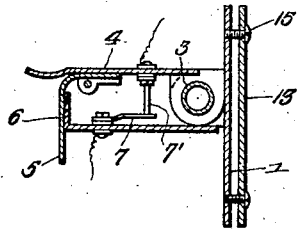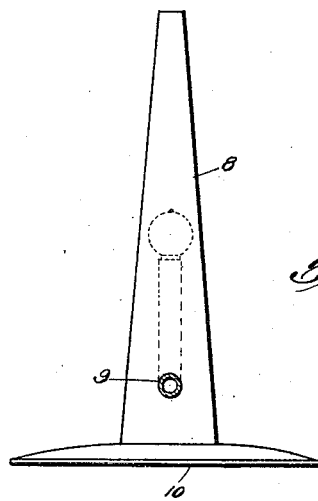

UNITED STATES PATENT OFFICE.

AXEL W. JOHNSON, OF PORTLAND, OREGON.

SIGNAL.

1,380,969.　　　　Specification of Letters Patent.　　Patented June 7, 1921.

Application filed August 16, 1919. Serial No. 317,938.

*To all whom it may concern:*

Be it known that I, AXEL W. JOHNSON, a citizen of the United States, residing at Portland, in the county of Multnomah and State of Oregon, have invented new and useful Improvements in Signals, of which the following is a specification.

This invention relates to automobile signaling devices for notifying the drivers of other vehicles and pedestrians that the automobile is about to make a turn.

The present invention is an improvement over that forming the subject matter of Letters-Patent of the United States #1,223,981, granted to me on April 24th, 1917.

The present invention relates to means for applying a spotlight to the device so that the said spotlight, the signal and the combined mirror and shield are all carried by the one bracket.

One of the objects of the invention is to provide a bracket and means thereon for supporting the rock shaft which carries the signal and mirror and also means for rotatably supporting the spotlight thereon.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a rear elevation showing the device attached to an automobile wind shield;

Fig. 2 is a plan view thereof;

Fig. 3 is a front elevation of the device alone;

Fig. 4 is a section on line 4—4 of Fig. 3;

Fig. 5 is a detailed section showing the means of supporting the spotlight on the bracket;

Fig. 6 is a detailed view showing the parts in a different position.

In these views 1 indicates a supporting bracket which is of substantially U-shape and this bracket is provided with the bearings 2 for the rock shaft 3. This rock shaft is connected with the combined operating arm and circuit closing arm 4. This arm 4 carries a spring latch member 5 which is adapted to engage with a projection 6 which extends laterally from the bracket. This projection has an opening therein which is adapted to engage a small projection on the latch member to hold the arm 4 in lowered position with the contacts 7 and 7' in engagement with each other so that the circuit is closed to the lamp. This lamp is located in the signal arm 8 carried by the outer section 9 of the rock shaft and the combined shield and mirror 10 is connected with said signal arm as shown. When the latch member is disconnected from the projection the coiled spring 11 will return the parts to a position with the signal arm projecting horizontally toward the front of the car and the mirror in proper position, and covering said arm from the rear.

The ends of the U-shaped bracket are provided with the hooked extensions 12 for engaging the wind shield frame and an adjustable jaw member 13 is also provided with a pair of hooked extensions 14 for co-operating with the hooks 12 to clamp the device to the wind shield frame. The member 13 is connected with the bracket by the screws 15 and said member is adjusted by the screws 16 carried by the bracket and having their heads appearing through openings in the adjustable member, whereby the said screws may be turned by a screw driver to adjust the said member. The cross piece of the U-shaped bracket is provided with an extension 17 which has a part bent at right angles as at 18 to form the outer bearing for the rock shaft and with a portion 19 which is rolled to provide a bearing for a post 20 which is adapted to support the spotlight 21. A sleeve 22 of insulating material is placed around the said post and said post has its upper end forked to receive a projecting lug 23 on the spotlight, said lug being pivotally mounted in said forked end by the pin 24. It will thus be seen that the spotlight may be rocked about a horizontal and vertical axis. The lamp wires from the spotlight are connected with terminal screws 24 on the bracket which are adapted to be connected with the wires leading from the battery of the automobile. The wires from the contacts 7 and 7' are also connected with said terminal screws.

It will thus be seen that the device as a whole, including the mirror, signal and spotlight may be sold as an article of manufacture and may be applied to the automobile by anyone without the use of any special tools, a screwdriver being the only tool necessary.

As the details of construction of the signal device are similar to those described in the before mentioned patent, such details will not be described further in this application.

It is thought from the foreging description that the advantages and novel features of my invention will be readily apparent.

I desire it to be understood that I may make changes in the construction and in the combination and arrangement of the several parts, provided that such changes fall within the scope of the appended claims.

What I claim is:—

1. A bracket for supporting a spot light and directional signal of an automobile comprising adjustable clamping means for clamping the same to the wind shield frame, horizontally arranged bearings arranged on one face of the bracket and adapted to receive the supporting shaft of the signal, an extension at the end of the bracket having horizontally arranged bearings at one face of said shaft and a vertically arranged bearing at its end for receiving the supporting post of the spot light.

2. A device of the class described comprising a bracket of U-shape having the ends of its legs provided with hooked parts, an adjustable jaw member carried by the bracket and having a pair of hooked parts thereon for coöperating with the hooked ends of the bracket, means for adjusting the position of said jaw member on the bracket, horizontally arranged bearings on the front face of the bracket for the supporting shaft of the signal means, and an extension formed on the cross piece of the bracket having its end rolled to provide a bearing for the supporting post of the spot light.

In testimony whereof I affix my signature.

AXEL W. JOHNSON.